United States Patent [19]

Tsai et al.

[11] 4,345,258

[45] Aug. 17, 1982

[54] COLOR DISPLAY SYSTEM

[75] Inventors: Robert C. Tsai, Montebello; William J. Kidwell, North Hollywood, both of Calif.

[73] Assignee: The Singer Company, Stamford, Conn.

[21] Appl. No.: 216,331

[22] Filed: Dec. 15, 1980

[51] Int. Cl.³ .............................................. G01D 9/32
[52] U.S. Cl. .................................. 346/17; 346/76 L; 353/20; 353/31
[58] Field of Search ................. 346/17, 76 L, 108, 18; 353/31, 34, 37, 20, 32, 33, 120–122; 350/331 R, 350 S, 388, 403; 358/61

[56] References Cited

U.S. PATENT DOCUMENTS

| | | | |
|---|---|---|---|
| 3,836,243 | 9/1974 | Melchior | 353/122 |
| 3,961,334 | 6/1976 | Whitby et al. | 346/17 |
| 4,060,316 | 11/1977 | Pollack et al. | 353/20 |
| 4,125,843 | 11/1978 | Whitby | 346/17 |
| 4,127,322 | 11/1978 | Jacobson et al. | 353/31 |
| 4,150,396 | 4/1979 | Hareng et al. | 358/60 |
| 4,191,456 | 3/1980 | Hong et al. | 353/31 |

Primary Examiner—G. Z. Rubinson
Assistant Examiner—W. J. Brady
Attorney, Agent, or Firm—David L. Davis; Robert E. Smith; Edward L. Bell

[57] ABSTRACT

A projection and display system utilizes a modulated laser beam whose energy distribution in the "P" and "S" polarization planes is controlled by a half wavelength retardation plate. The laser beam is then deflected along the X and Y axes and passes through a dichroic polarizer cube which splits the beam to focus upon a P channel smectic liquid crystal display cell and an S channel smectic liquid crystal display cell to selectively form images on one or both of the display cells. At the same time, the formed images are projected by the use of light that is split into two colored light beams by a second dichroic cube and is reflected to back light the images in each of the display cells. The projected beams then pass back through the first dichroic cube where they are recombined and passed through a projection lens system to a suitable display screen. To selectively erase the information on either of the display cells, an AC bias is applied to that display cell during the laser scan thereof.

7 Claims, 2 Drawing Figures

COLOR DISPLAY SYSTEM

BACKGROUND OF THE INVENTION

This invention relates to display systems and, more particularly, to a combined laser recorder and projection system in which two channels of data are recorded by laser action on smectic liquid crystal display cells and are simultaneously projected, by back lighting the display cells, upon a display screen.

U.S. Pat. No. 3,961,334, which issued to Clyde M. Whitby and Douglas L. White on June 1, 1976, discloses a high speed, permanent recording, multicolor projection display system in which the beam of a pulsed laser is selectively deflected and focused to burn the desired images in a metalized film record medium which is back-illuminated for projecting the recorded images as they are produced. A channel selector polarizes the laser beam in either of two planes. The polarized channels are then selectively deflected and focused through a dichroic polarizer cube that transmits one channel and reflects the other channel to the metalized films in the focal planes where images are formed by thermal action. Simultaneously with the recording action, the images are projected by the use of white light that is split into two colored light beams by a second dichroic cube and is reflected to back light the images in each of the metalized films. The projected beams then pass back through the first dichroic cube where they either pass directly, as colored images, to the projection lens system, or are combined into white images before entering the projection lens system. Colored filters may be inserted into either or both of the projection lamp beams to produce various colored images. The disclosed system operates satisfactorily. However, the use of a metalized film as the recording medium possesses the disadvantage that a permanent image is formed. In order to change the image, other than by adding to it, the metalized film must be physically moved to a "clean" area and the image must be completely re-formed. There are many applications where it would be desirable to be able to selectively change only certain areas of the image without affecting the remaining areas of the image.

It is therefore a primary object of this invention to provide a display system which may be selectively altered.

SUMMARY OF THE INVENTION

The foregoing and additional objects are attained in accordance with the principles of this invention by providing a recording and projection system comprising a laser providing a substantially single frequency beam of coherent energy having a wavelength outside the range of wavelengths of visible light, means for focusing the laser beam, controllable polarization means interposed in the path of the laser beam for selectively controlling the polarization of the laser beam between a first plane of polarization and a second plane of polarization, a dichroic polarizer cube interposed in the path of the laser beam downstream from the polarization means, the cube having the property that it is substantially totally reflective to components of the laser beam that are polarized in the first plane and substantially totally transmissive to components of the laser beam that are polarized in the second plane, the cube having the further property that short wavelength visible light is reflected by the cube and long wavelength visible light is transmitted by the cube, first and second locally erasable recording mediums positioned at the focal points of the reflected and transmitted laser beams, respectively, deflecting means upstream from the polarizer cube for scanning the reflected and transmitted laser beams across the first and second recording mediums, respectively, modulating means upstream from the deflecting means for modulating the intensity of the laser beam, means for selectively erasing the first and second recording mediums, means for providing a beam of white projection light, a dichroic element interposed in the projection beam having dichroic properties substantially identical to the further property of the polarizer cube, the dichroic element producing from the beam of white light a beam of long wavelength visible light that is transmitted through the element and a beam of short wavelength visible light that is reflected by the element, means for back lighting the first recording medium with the long wavelength visible light beam, to form a long wavelength image, means for back lighting the second recording medium with the short wavelength visible light beam, to form a short wavelength image, a first colored filter interposed in the long wavelength visible light beam, a second colored filter interposed in the short wavelength visible light beam, means for combining the long and short wavelength visible light beams to form a combined wavelength image, and means for projecting the combined wavelength image.

BRIEF DESCRIPTION OF THE DRAWINGS

The foregoing will be more readily apparent upon reading the following description in conjunction with the drawings wherein.

DETAILED DESCRIPTION

Figure 1:
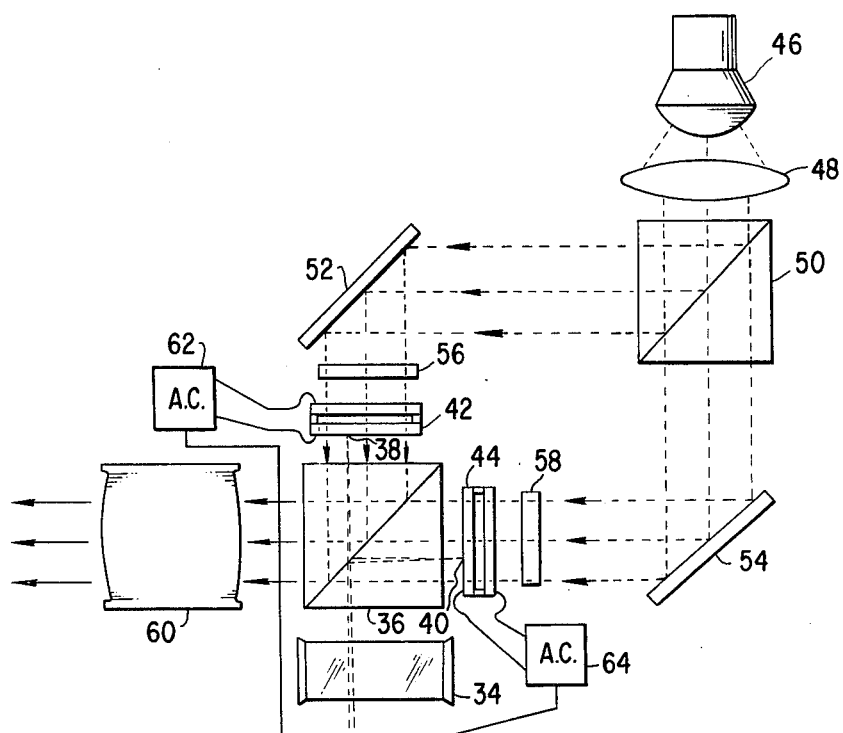
FIG. 1 is a simplified drawing schematically illustrating the optical components of a system constructed in accordance with the principles of this invention.

Referring now to the drawings, FIG. 1 schematically illustrates a recording and projection system utilizing the principles of this invention. The illustrated system includes a yttrium aluminum garnet (YAG) laser 10 having a polarized emitting wavelength of 1064 nanometers. The output beam of the laser 10 is reflected by a mirror 12 and enters an acousto-optical modulator 14 which, upon command of control circuitry 16, selectively prevents or allows the laser beam from exiting therefrom.

After the laser beam leaves the acousto-optic modulator 14, it passes through a polarization rotator 18. The polarization rotator 18 is illustratively a one half wavelength retardation plate, which may be illustratively a part number R-D-P-10 manufactured by Continental Optics of Hauppauge, N.Y. The half wavelength retardation plate 18 is illustratively rotatable by means of a stepper motor 20, under the control of the control circuitry 16, to rotate the polarization of the laser beam within a range of from 0° to 90° with respect to the polarization characteristics of the subsequent optical elements in the system of FIG. 1. Thus, the control circuitry 16 may selectively energize the stepper motor 20 to rotate the half wavelength retardation plate 18 so as to produce a laser beam having a desired polarization between a first plane of polarization and a second plane of polarization.

The appropriately polarized laser beam then passes through a beam expander 22 and impinges upon the mirror 24 of the X-deflection galvanometer 26 which is under the control of the control circuitry 16 to deflect the laser beam along the horizontal direction as it enters the relay lens 28. The relay lens 28 operates to focus the X-deflected laser beam from the mirror 24 upon the mirror 30 of the Y-deflection galvanometer 32. The laser beam is then focused by a focus lens 34 and passes through the dichroic polarizer cube 36.

Figure 2:
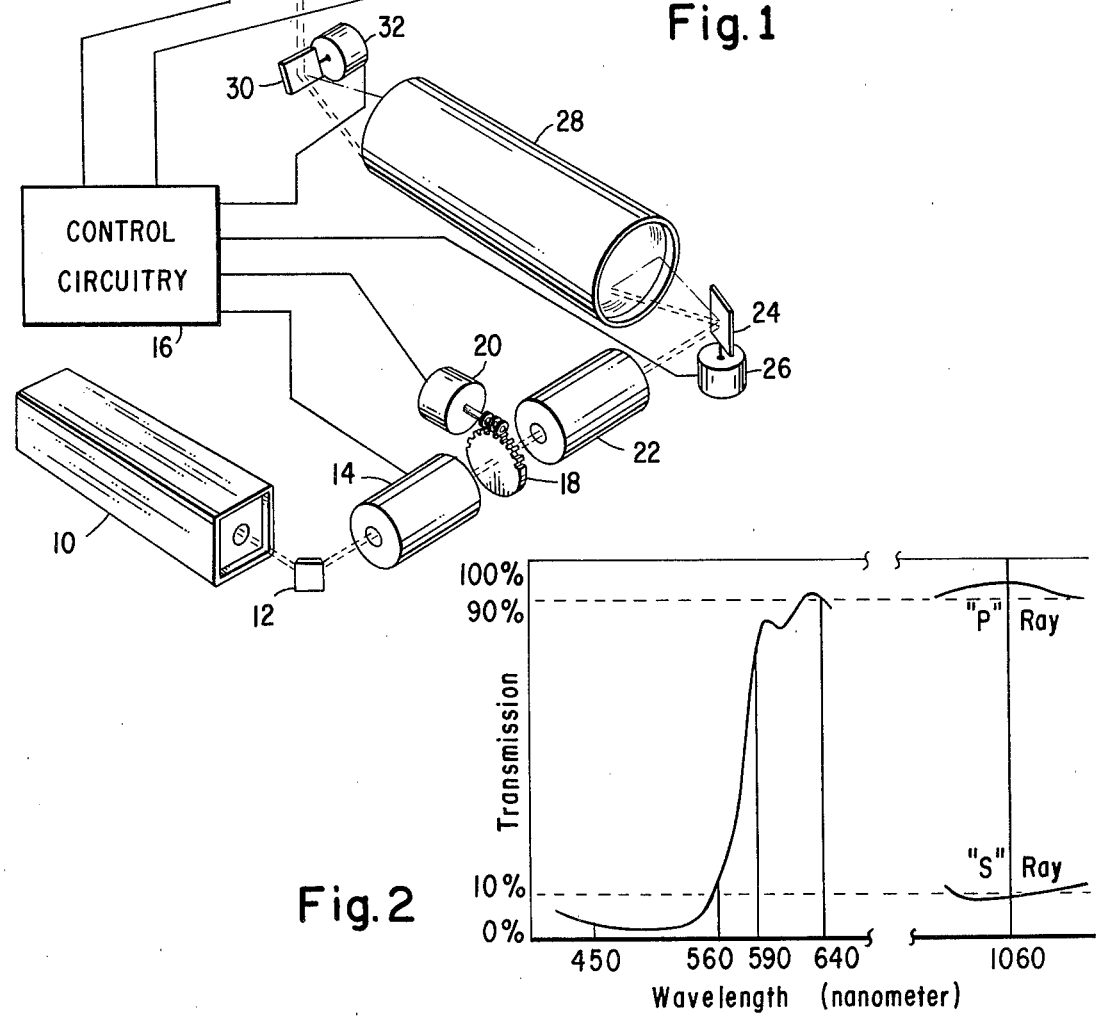
FIG. 2 is a drawing illustrating the light transmission characteristics of an illustrative dichroic polarizer cube which may be utilized in the system shown in FIG. 1.

Before proceeding further with the description of the laser recording and projection system of the invention, the characteristic of the dichroic polarizer cube 36 will be discussed. In a conventional dichroic cube, a dichroic material is selected that will transmit light energy above a desired wavelength and reflect the energy below that wavelength. As illustrated in FIG. 2, in the present invention the dichroic cube 36 contains a dichroic that transmits light energy within the range of visible wavelengths from about 590 nanometers to 640 nanometers (the red end of the spectrum) and reflects light energy having wavelengths in the range from about 450 nanometers to about 560 nanometers (the green end of the spectrum). Additionally, the dichroic polarizer cube 36 is provided with another dichroic coating active in the region of the wavelength of the YAG laser 10, i.e., a wavelength of 1064 nanometers. At this wavelength, if the laser beam is polarized in the "S" plane, the beam is nearly totally reflected whereas if the beam is polarized in the "P" plane the beam is almost totally transmitted. Beams having polarizations intermediate the "S" plane and the "P" plane will be reflected and transmitted in accordance with the "S" and "P" component energy distribution. A cube such as that described herein and having characteristics as shown in FIG. 2 is commercially available from ZC&R Inc., of Long Beach, Calif.

The beam from laser 10, having been suitably deflected by the X-deflection galvanometer 26 and the Y-deflection galvanometer 32, is focused by the focusing lens 34 to the focal points 38 and 40 depending upon the polarization impressed upon the laser beam by the half wavelength retardation plate 18. In this regard, it is to be noted that the laser beam can be focused at both the focal points 38 and 40 with an energy distribution at these two points dependent upon where in the range between the first and second polarization planes the laser beam has been polarized by the half wavelength retardation plate 18.

Positioned at the focal points 38 and 40 are locally erasable recording mediums, preferably smectic liquid crystal display cells 42 and 44 of the type disclosed in U.S. Pat. No. 3,836,243, which issued to Hans Melchior on Sept. 17, 1974. Such a display cell includes a layer of liquid crystal substance and transparent supporting substrates. A laser beam utilized as a localized source of heat will heat selected areas of the liquid crystal substance beyond a transition temperature to produce long-lasting light-scattering regions and can also be used for erasing those light-scattering regions. In particular, selected areas of the liquid crystal substance are heated to a suffiently high temperature to transform them from the mesophase to the isotropic liquid phase (or from a first phase in the mesophase to a second). The substance is then cooled from the isotropic liquid phase to the mesophase (or from the second phase in the mesophase to the first) to form long-lasting light-scattering areas. Once information is "written into" the liquid crystal display cell in this fashion, it can be stored or, if desired, the cell can be erased, in whole or in part, by applying a suitable AC voltage to the cell. Light may then be projected through the cell and through a projection system for displaying the information "written into" the cell.

The focused laser beam, having an energy distribution determined by the angular position of the half wavelength retardation plate 18, is scanned across the display cells 42 and 44 and selectively blanked and unblanked by the acousto-optical modulator 14 under the control of circuitry 16, to write information on the display cells 42, 44. At the same time that the focused laser beam is recording data on the display cells 42, 44, these cells are being back lighted so that the images thereon are projected to a suitable display screen. The projection system includes a Xenon lamp 46 that emits white light in the normal visible range of 400–700 nanometers. Xenon lamp 46 is at the focal point of a condensing lens 48 which directs the white light to a dichroic element 50. Element 50 has the identical dichroic properties as the dichroic polarizer cube 36. That is, the element 50 need not have the polarization features as described in connection with FIG. 2, but should have identical dichroic properties as those of the cube 36 so that the white light which is to be divided into two bands by the cube 50 may ultimately be combined in the cube 36 into white light, as will subsequently be described.

Thus, as may be seen from an examination of FIG. 2, the white light from the lamp 46 is divided into a short wavelength visible light beam (the green beam) which is reflected by the cube 50 and a long wavelength visible light beam (the red beam) which is transmitted by the cube 50. As shown in FIG. 1, the reflected short wavelength visible light beam is directed by a mirror 52 to back light the display cell 42 and the long wavelength visible light beam that is transmitted by the cube 50 is directed by a mirror 54 to back light the display cell 44. A green filter 56 is interposed in the short wavelength visible light beam path and a red filter 58 is interposed in the long wavelength visible light beam path. Accordingly, the image which was written into the display cell 42 is back lit with light of a first color and the image which was written into the display cell 44 is back lit with light of a second color.

Because the dichroic properties of the cube 50 are identical with those of the cube 36, the light band that was reflected by the cube 50 will also be reflected by the cube 36 and the light band transmitted by the cube 50 will also be transmitted by the cube 36. Therefore, the reflected light band from the cube 50 will be projected through the display cell 42 and this band will again be reflected by the dichroic in the cube 36 to pass through the projection lens 60 to a suitable display screen. In like manner, the band transmitted by the cube 50 will pass through the display cell 44 and will also be transmitted by the cube 36 to the projection lens 60 and onto the suitable display screen.

The system illustrated in FIG. 1 also includes an AC source 62 coupled across the display cell 42 and an AC souce 64 coupled across the display cell 44. The AC sources 62 and 64, under the control of circuitry 16, provide an AC bias across their respective display cells 42, 44, for erasing portions or all of the display cell. The AC bias provided by the sources 62, 64 is at a frequency within a range of frequencies from about 30 hertz up to about 100 megahertz, preferably at a frequency of about 20 kilohertz, with a peak to peak voltage in the range from about 20 volts to about 140 volts.

Under the control of circuitry 16, which may take the form of a programmed computer, the system illustrated in FIG. 1 can provide a number of display features. Thus, the half wavelength retardation plate 18 can be oriented so that either the "P" or "S" polarization of the laser beam can be selected to write or erase on either the display cell 42 or the display cell 44, respectively. Also, the half wavelength retardation plate 18 can be oriented so that the laser beam polarization is rotated 45° from both the "P" and "S" polarization axes so that both of the display cells 42, 44 can be written or erased simultaneously. The system according to this invention also provides means to write on one display cell and to erase the other simultaneously by adjusting the half wavelength retardation plate 18 to a 45° orientation and applying the AC bias to the display cell which is to be erased. As a result of this, an instant color change of the image can be made to appear on the display screen. Further, the distribution of the laser energy of the "P" and "S" beams can be controlled by the proper rotation of the half wavelength retardation plate 18. Therefore, different levels of gray scale can be obtained to provide a means for generating a color spectrum from the combination of addition and subtraction of two prime colors. The prime colors are determined by the color filters 56 and 58 selected in the projection system.

Accordingly, there has been disclosed an improved recording and projection system. It is understood that the above-described embodiment is merely illustrative of the application of the principles of this invention. Numerous other embodiments may be devised by those skilled in the art without departing from the spirit and scope of this invention, as defined by the appended claims.

We claim:
1. A recording and projection system comprising:
a laser providing a substantially single frequency beam of coherent energy having a wavelength outside the range of wavelengths of visible light;
means for focusing said laser beam;
controllable polarization means interposed in the path of said laser beam for selectively controlling the polarization of said laser beam within a range between a first plane of polarization and a second plane of polarization so as to control the distribution of laser energy in said first and second planes of polarization;
a dichroic polarizer cube interposed in the path of said laser beam downstream from said polarization means, said cube having the property that it is substantially totally reflective to components of said laser beam that are polarized in said first plane and substantially totally transmissive to components of said laser beam that are polarized in said second plane, said cube having the further property that short wavelength visible light is reflected by said cube and long wavelength visible light is transmitted by said cube;
first and second locally erasable recording mediums positioned at the focal points of the reflected and transmitted laser beams, respectively;
deflecting means upstream from said polarizer cube for scanning said reflected and transmitted laser beams across said first and second recording mediums, respectively;
modulating means upstream from said deflecting means for modulating the intensity of said laser beam;
means for selectively erasing said first and second recording mediums;
means for providing a beam of white projection light;
a dichroic element interposed in said projection beam having dichroic properties substantially identical to the further property of said polarizer cube, said element producing from said beam of white light a beam of long wavelength visible light that is transmitted through said element and a beam of short wavelength visible light that is reflected by said element;
means for back lighting said first recording medium with said long wavelength visible light beam to form a long wavelength image;
means for back lighting said second recording medium with said short wavelength visible light beam to form a short wavelength image;
a first colored filter interposed in said long wavelength visible light beam;
a second colored filter interposed in said short wavelength visible light beam;
means for combining said long and short wavelength visible light beams to form a combined wavelength image; and
means for projecting said combined wavelength image.

2. The system according to claim 1 wherein said controllable polarization means includes a half wavelength retardation plate and means for selectively rotating said plate.

3. The system according to claim 1 wherein said laser is a YAG laser operating at a wavelength of about 1064 nanometers, the short wavelength visible light has wavelengths in the range from about 450 nanometers to about 560 nanometers and the long wavelength visible light has wavelengths in the range from about 590 nanometers to about 640 nanometers.

4. The system according to claim 1 wherein said first and second recording mediums each includes a smectic liquid crystal display cell and said erasing means includes means for selectively applying an AC bias across each of the display cells.

5. The system according to claim 4 wherein the AC bias is within a range of frequencies from about 30 hertz to about 100 megahertz with a peak to peak voltage in the range from about 20 volts to about 140 volts.

6. The system according to claim 5 wherein the AC bias is at a frequency of about 20 kilohertz.

7. The system according to claim 1 wherein said combining means includes means for directing said long and short wavelength visible light beam images through said dichroic polarizer cube.

* * * * *